United States Patent
Liebler-Ranzus

(10) Patent No.: US 7,421,056 B2
(45) Date of Patent: Sep. 2, 2008

(54) FUEL ASSEMBLY FOR A BOILING WATER REACTOR

(75) Inventor: Michael Liebler-Ranzus, Heilsbronn (DE)

(73) Assignee: Areva NP GmbH, Erlangen (DE)

( * ) Notice: Subject to any disclaimer, the term of this patent is extended or adjusted under 35 U.S.C. 154(b) by 0 days.

(21) Appl. No.: 10/938,206

(22) Filed: Sep. 10, 2004

(65) Prior Publication Data

US 2005/0105676 A1    May 19, 2005

Related U.S. Application Data

(63) Continuation of application No. PCT/EP03/01110, filed on Feb. 5, 2003.

(30) Foreign Application Priority Data

Mar. 14, 2002    (DE) ................................ 102 11 179

(51) Int. Cl.
*G21C 3/34* (2006.01)
*G21C 3/32* (2006.01)

(52) U.S. Cl. .................... 376/439; 376/442; 376/443

(58) Field of Classification Search .......... 376/438–444
See application file for complete search history.

(56) References Cited

U.S. PATENT DOCUMENTS

| | | |
|---|---|---|
| 3,708,160 A | 1/1973 | Kantarian et al. |
| 3,899,165 A | 8/1975 | Abram et al. |
| 4,585,616 A * | 4/1986 | DeMario et al. ............ 376/439 |
| 4,702,881 A * | 10/1987 | Weiland et al. ............. 376/442 |
| 4,726,926 A * | 2/1988 | Patterson et al. ............ 376/439 |
| 4,728,490 A * | 3/1988 | Taleyarkhan ................ 376/439 |
| 4,999,153 A | 3/1991 | Johansson et al. |
| 5,106,575 A | 4/1992 | Nakamura et al. |
| 5,128,098 A | 7/1992 | Nakamura et al. |
| 5,180,548 A * | 1/1993 | Verdier ....................... 376/439 |
| 5,183,629 A | 2/1993 | Canat et al. |
| 5,265,140 A | 11/1993 | Perrotti |
| 5,526,387 A * | 6/1996 | Johansson et al. ........... 376/439 |

FOREIGN PATENT DOCUMENTS

| | | |
|---|---|---|
| EP | 0 378 384 A2 | 7/1990 |
| EP | 0 468 870 A1 | 1/1992 |
| GB | 388917 | 3/1933 |
| JP | 02006788 | 1/1990 |
| JP | 05323073 A | 12/1993 |

* cited by examiner

*Primary Examiner*—James P. Trammell
*Assistant Examiner*—Daniel L Greene
(74) *Attorney, Agent, or Firm*—Laurence A. Greenberg; Werner H. Stemer; Ralph E. Locher

(57) ABSTRACT

A spacer for a fuel element of a boiling water reactor contains cells that are formed by inner partitions, which are disposed in a crisscross manner, and by outer partitions, which surround the inner partitions in a frame-like manner. A guiding device is placed on the spacer and contains a flow-through opening, which is located in an outer partition. The guiding device also contains a guiding element which, when viewed in the direction of flow of the coolant, is located in front of the flow-through opening, and is situated at a distance from the inner side of the outer partition, and interacts with the flow-through opening like a venturi nozzle.

10 Claims, 7 Drawing Sheets

FIG. 3A
FIG. 3B
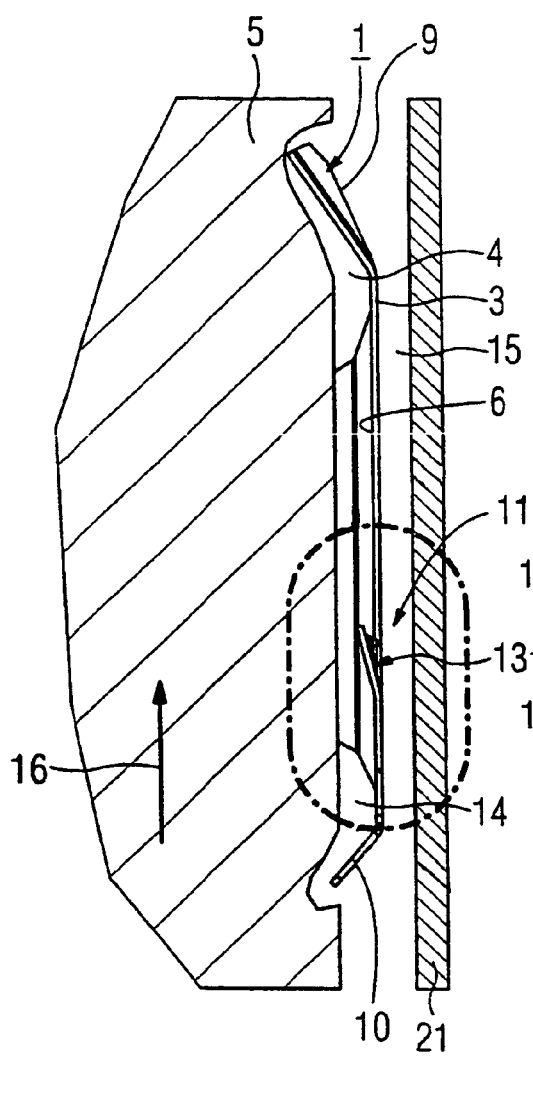
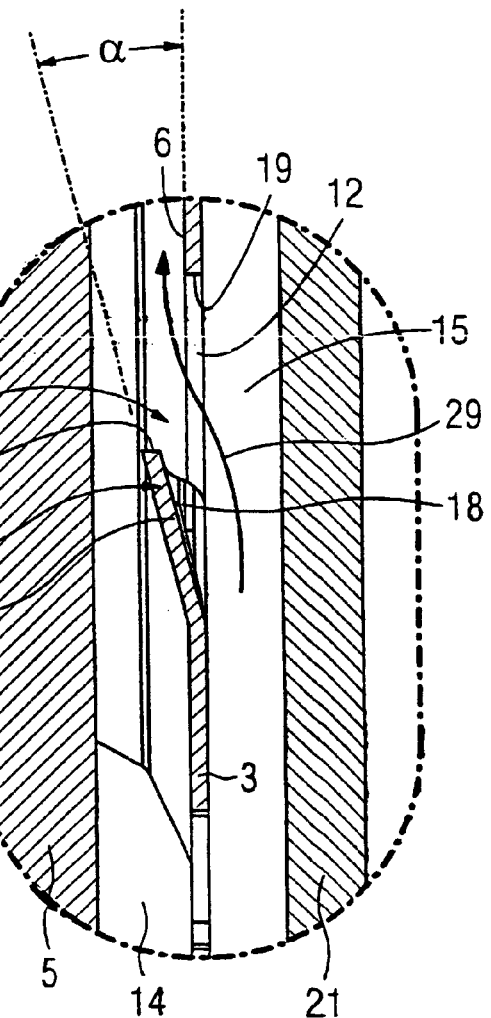

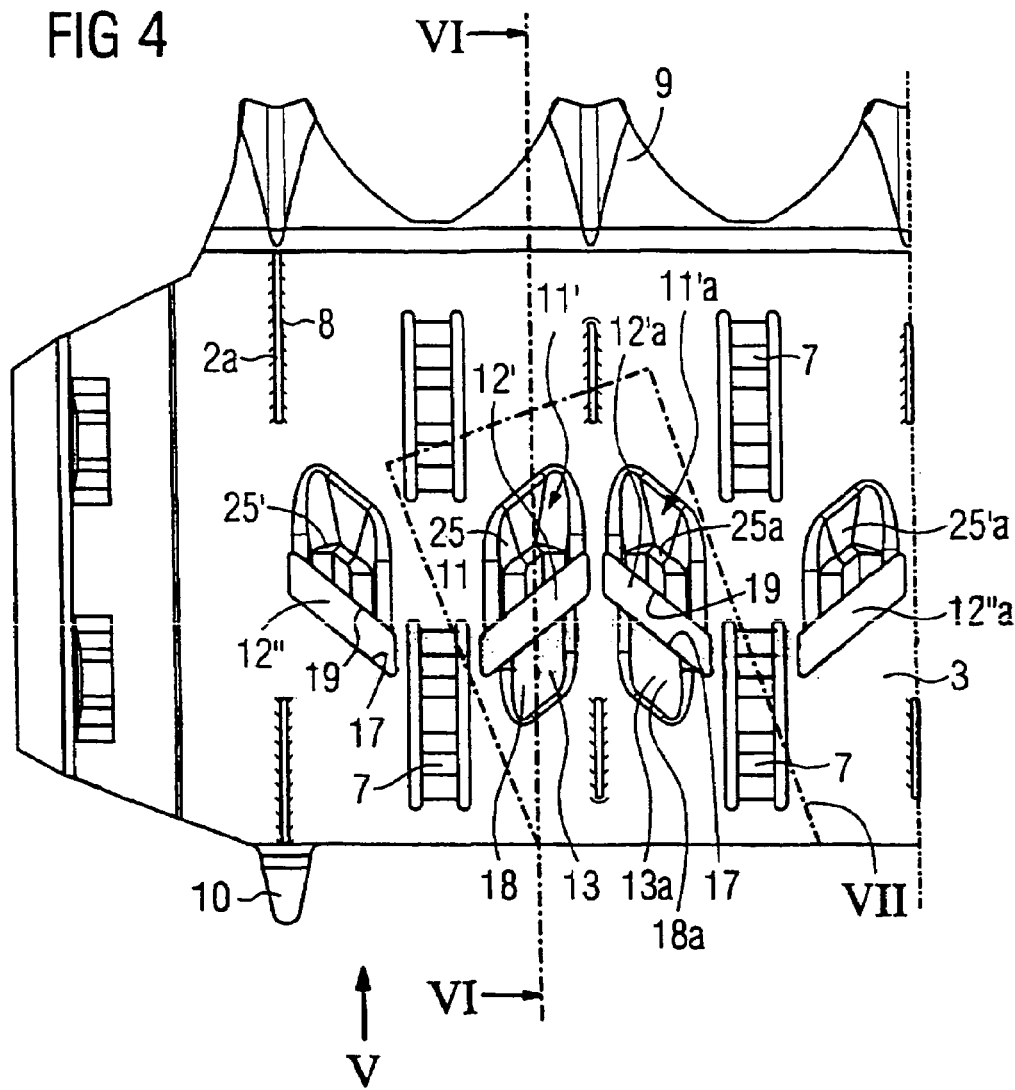
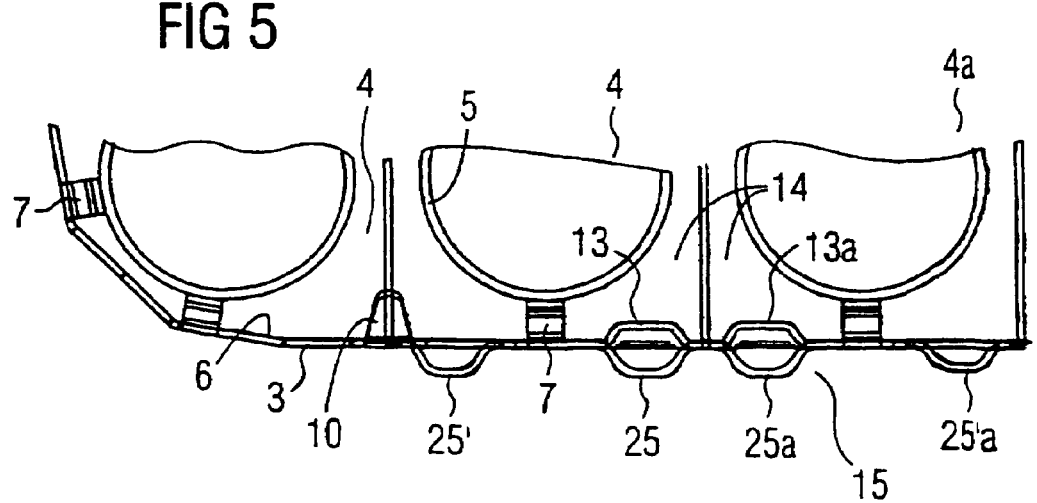

FIG. 10A
FIG. 10B
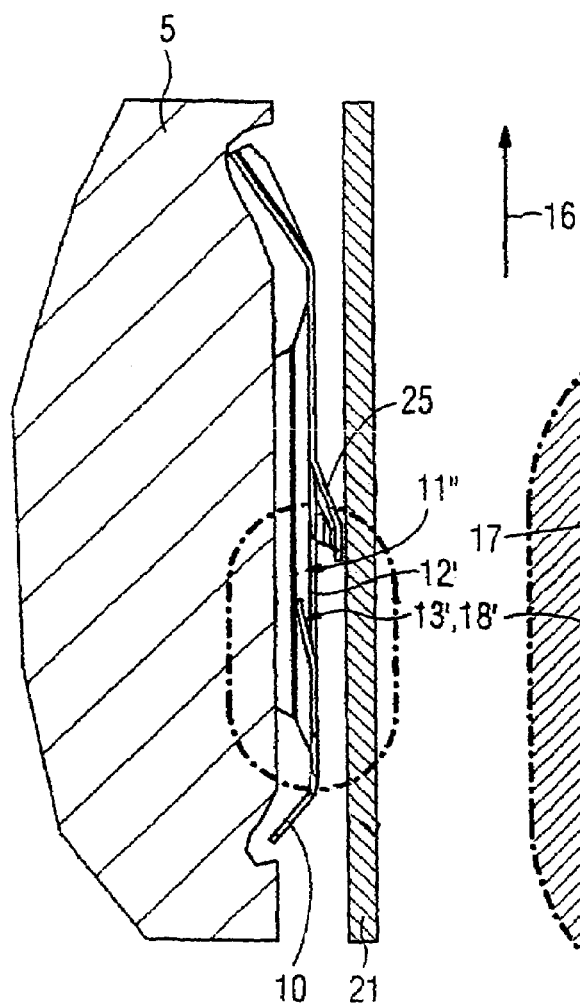
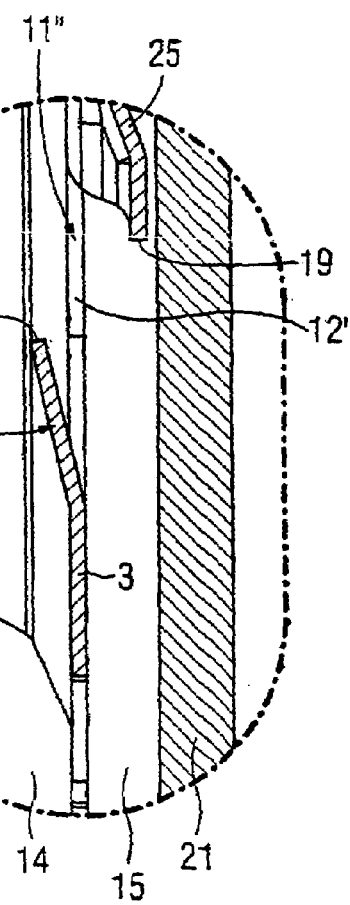

FUEL ASSEMBLY FOR A BOILING WATER REACTOR

CROSS-REFERENCE TO RELATED APPLICATION

This is a continuing application, under 35 U.S.C. § 120, of copending international application No. PCT/EP03/01110, filed Feb. 5, 2003, which designated the United States; this application also claims the priority, under 35 U.S.C. § 119, of German patent application No. 102 11 179.0, filed Mar. 14, 2002; the prior applications are herewith incorporated by reference in their entirety.

BACKGROUND OF THE INVENTION

Field of the Invention

The invention relates to a spacer for a fuel bundle of a boiling water reactor, having cells formed by inner webs disposed in crosswise fashion and by outer webs surrounding the inner webs in the form of a frame. In the case of a fuel assembly for a boiling water reactor, a number of fuel rods are combined to form a fuel bundle in a fuel assembly channel. A number of spacers serving to guide the fuel rods are disposed over the fuel rod length. During reactor operation, water flows as primary coolant in the boiling water reactor from below into the fuel assembly and flows upward through the latter. The heat dissipated by the fuel rods heats the water as a result of which the latter partially evaporates. There is thus a two phase mixture of water and steam in the upper region of the fuel assembly. At the exit from the fuel element, the steam fraction is usually at approximately 60%.

There are special requirements placed on the configuration of a fuel assembly because of the two-phase flow typical of the boiling water reactor. Next to the observance of a suitable neutron moderation, this relates, in particular, to ensuring that the cooling of the fuel rods is sufficient, that is to say, adequate heat dissipation from the surface thereof. It must be ensured that the surface of the fuel rods is wetted with an adequate quantity of water. Specifically, this is a precondition for the so-called "nucleate boiling" in which steam bubbles are produced locally which propagate and finally burst. Heat is transferred in this case substantially through an annular zone below the bubble. However, there is the risk of so-called "foam boiling" because of the high steam quality in the upper region of the fuel element. This is understood as the effect that a water film located on the fuel rod surface boils off over the area without forming bubbles, something which finally leads to the fact that the fuel rod is no longer wetted with water in this region. The lesser degree of cooling thereby engendered raises the temperature sharply in the fuel rod and can lead to damage in the fuel rod.

It is known that there flows along the inner wall of the fuel assembly channel a coolant film whose steam quality increases in the upper region of the fuel bundle. It is known to use the cooling potential of the coolant film by leading coolant radially inward into the fuel bundle in the region of a spacer. A measure with the aid of which this can be achieved is described in U.S. Pat. No. 4,999,153. Grooves, so-called flow trippers running transverse to the flow direction of the coolant are worked into the inner wall of the fuel assembly channel. These serve the purpose of turbulently mixing the coolant flow at the inner channel wall. Positioned downstream of the grooves in the flow direction are discharge elements that project from the outer side of the outer webs and, as it were, scrape the water film turbulently mixed by the grooves from the inner channel wall and redirect it via a flow opening into the interior of the fuel bundle. In the case of a spacer known from Japanese Patent JP 05323073 A, a similar effect is achieved with the aid of outer webs penetrated by inflow openings.

SUMMARY OF THE INVENTION

It is accordingly an object of the invention to provide a fuel assembly for a boiling water reactor which overcomes the above-mentioned disadvantages of the prior art devices of this general type, in which coolant flowing at the inner channel wall can be rendered useful for fuel rod cooling in an alternative way.

With the foregoing and other objects in view there is provided, in accordance with the invention, a fuel assembly for a boiling water reactor. The fuel assembly contains inner webs disposed in a crosswise fashion and outer webs each having an inner side and surround the inner webs in a form of a frame. The inner webs and the outer webs together define and form a number of spacers having cells for receiving fuel rods. Each of the spacers contains at least one guide device disposed in a respective outer web. The guide device has a flow opening and a guide element. The guide element as viewed in a flow direction of a coolant, is disposed upstream of the flow opening, and projects from the inner side of the respective outer web. The guide element constricts a flow channel formed by a surface of a respective fuel rod and the inner and outer webs surrounding the respective fuel rod. Inwardly projecting clamping springs are provided and each cooperates with a respective one of the fuel rods. The guide device is disposed at a region of the respective outer web extending between a respective inwardly projecting clamping spring cooperating with the respective fuel rod and a respective inner web.

The object is achieved by a spacer having a guide device that has a flow opening, disposed at an outer web and a guide element which—seen in the flow direction of the coolant—is disposed upstream of the flow opening, and projects from the inner side of the outer web, and cooperates with the flow opening in the manner of a Venturi tube. In the case of a Venturi tube, a suction port connected to the surroundings opens out at a constricted site of a flow channel. The increased rate of flow at the constricted site of the flow channel results in a subatmospheric pressure that propagates outward via the suction port. A flow channel is formed by the region between the surface of a fuel rod and the inner and outer webs surrounding it, the channel is restricted by the inwardly projecting guide element. By contrast with the coolant flowing past the outer side, the coolant flowing at the inner side of the outer web encounters a cross-sectional constriction in the form of the inwardly projecting guide element, and this leads to the abovementioned increase in the speed or the kinetic energy of the coolant, and through a corresponding lowering of the pressure. The coolant flowing along the inner channel wall is therefore sucked through the flow opening, as it were. If practically every cell is assigned at least one such guide device, the cooling potential of the inner wall flow can be utilized to a marked extent. The distance to the boiling transition line is increased in this way, and the risk of film boiling is thereby reduced. In a preferred embodiment variant, the guide element is a flow vane that is integrally formed on the outer webs and forms an acute angle, opening in the flow direction, with the flat plane of the outer web. Such a flow vane can be produced in a simple way. It is preferably formed by cutouts which extend approximately in the flow direction and open out into the lower edge of the flow opening. When upper and lower are mentioned here and in what follows, they relate to the installed state of the spacer or the fuel assembly.

Another refinement, which is preferred in particular from the point of view of production engineering, provides that the flow vane is formed by a deep-drawn wall region of the outer web that adjoins the lower edge of the flow opening.

In a further preferred embodiment, each cell adjoining an outer web is assigned at least one guide device, in order to increase the inwardly directed coolant fraction. The flow openings preferably have a greater width than the guide elements. It has emerged that it is possible by this refinement to make better use of the suction effect of the guide elements, that is to say a larger coolant quantity can be guided to the fuel bundle.

Clamping springs that cooperate with the fuel rods, are present both at the inner webs and at the outer webs in the case of spacers of the type under discussion. Such clamping springs are disposed in the middle of the outer web region defining the edge length of a cell. It is therefore expedient to dispose the guide devices at the region of an outer web extending from a clamping spring up to the next inner web in each case.

The flow openings are preferably configured the form of an elongated hole assigned obliquely to the flow direction. Disposed in this refinement, a flow component that is radially fastened to a fuel rod can be imposed on the coolant flow penetrating the flow opening. Preference is accorded to two adjacently disposed flow openings that are aligned obliquely in opposite senses with the formation of an acute angle opening against the flow direction. In particular, in this case, the two flow openings are assigned to neighboring cells. The efficiency of the guide device is increased by virtue of the fact that the upper edge of the flow opening and the wall region of the outer web, subsequent thereto in the flow direction, are cambered convexly outward.

Other features which are considered as characteristic for the invention are set forth in the appended claims.

Although the invention is illustrated and described herein as embodied in a fuel assembly for a boiling water reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3A is a longitudinal section view taken along the line III—III shown in FIG. 1, clamping springs and the inner web having been omitted for reasons of clarity;

FIG. 3B is a section view showing an enlarged detail of an area of FIG. 3A shown in dotted lines;

FIG. 4 is a diagrammatic, side-elevational view of a second exemplary embodiment of a spacer in a representation corresponding to FIG. 1;

FIG. 5 is a plan view taken in a direction of arrow V shown in FIG. 4;

FIG. 10A is a longitudinal sectional view taken along the line X—X shown in FIG. 8, in a representation corresponding to FIG. 3A; and FIG. 10B is a sectional view showing an enlarged detail of an area shown by dotted lines in FIG. 10A.

DESCRIPTION OF THE PREFERRED EMBODIMENTS

Figure 1:
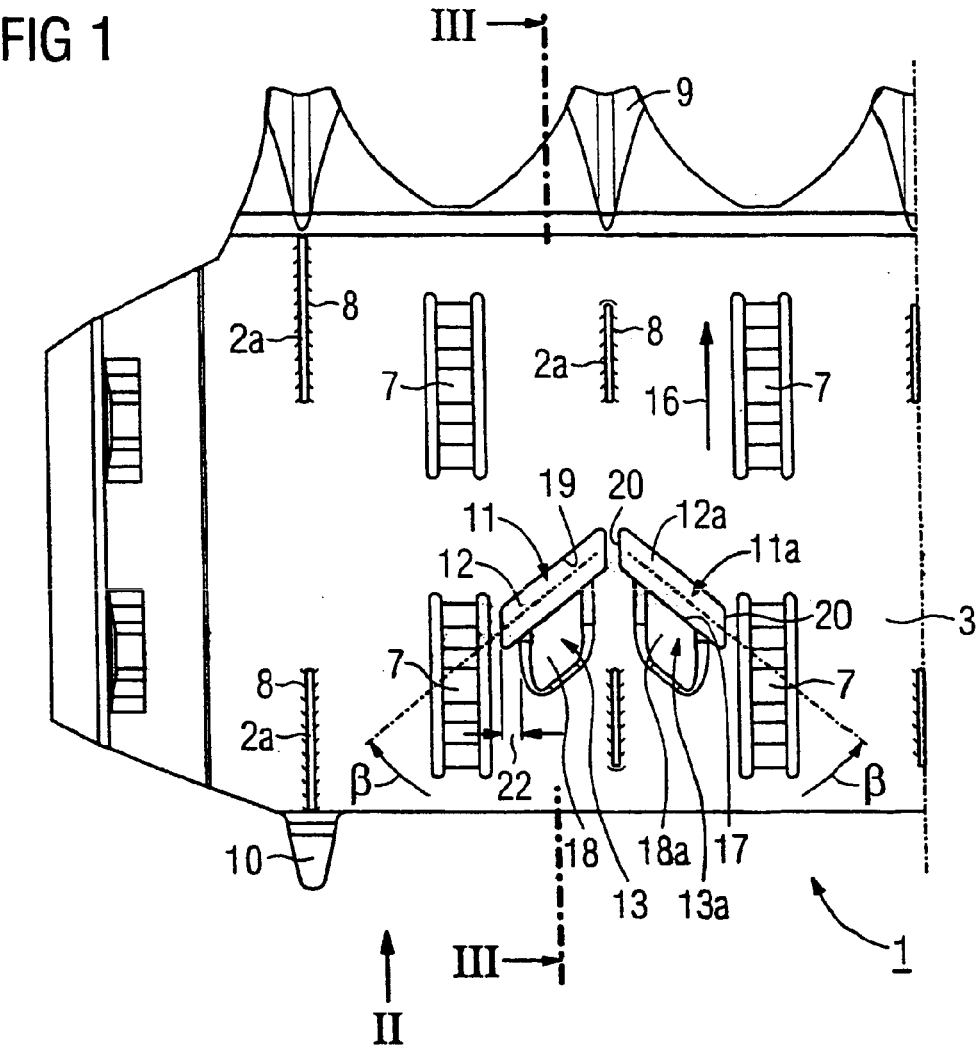
FIG. 1 is a diagrammatic, side-elevational view of a detail of a first exemplary embodiment of a spacer according to the invention.
Figure 2:
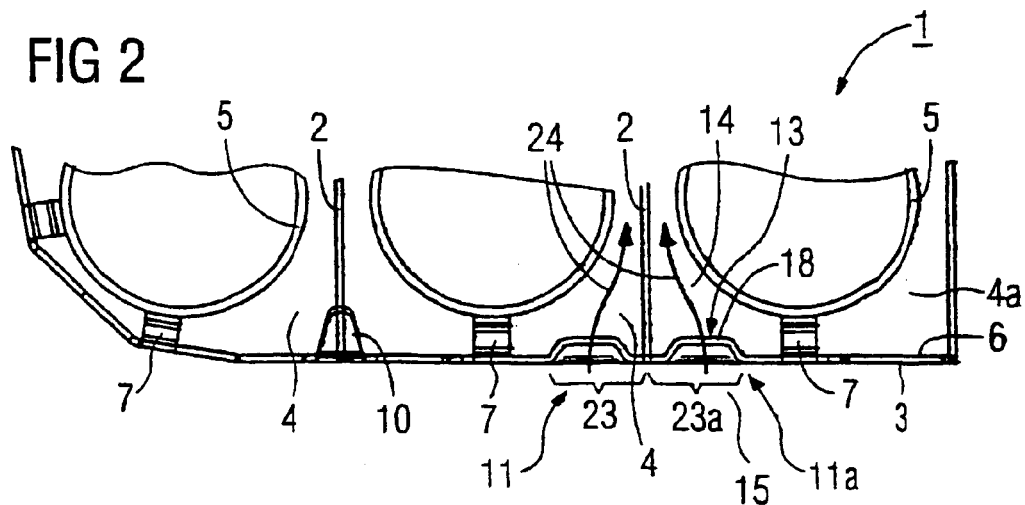
FIG. 2 is a plan view taken in a direction of arrow II shown in FIG. 1.
Figure 6A:
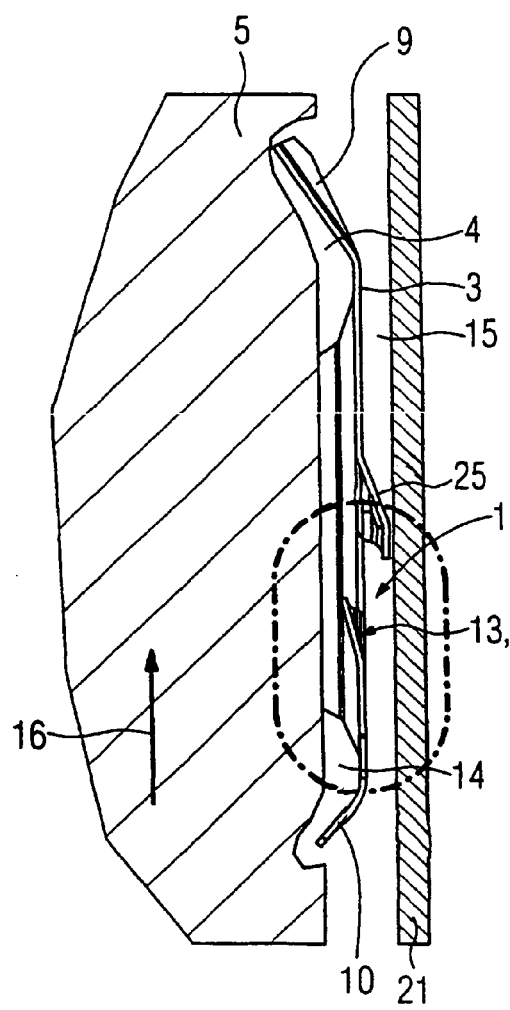
FIG. 6A is a longitudinal sectional view taken along the line VI—VI shown in FIG. 4, in a representation corresponding to FIG. 3A.
Figure 6B:
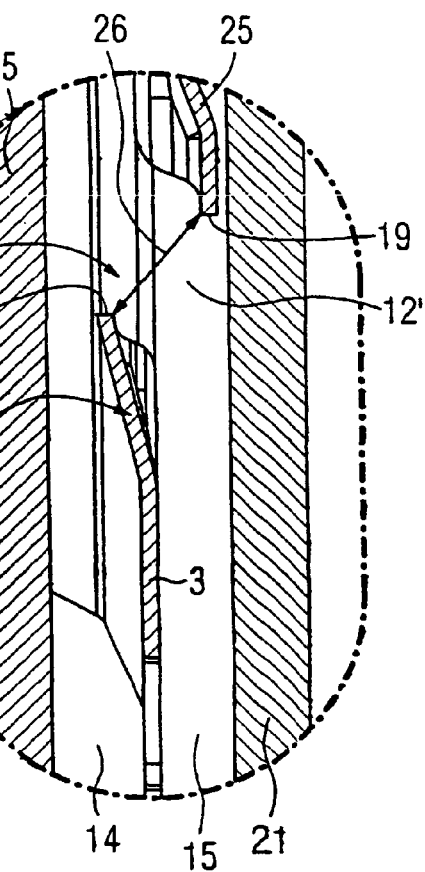
FIG. 6B is a sectional view showing an enlarged detail of the area shown by dotted lines in FIG. 6A.

Referring now to the figures of the drawing in detail and first, particularly, to FIGS. 1 and 2 thereof, there is shown a spacer 1 of a fuel assembly of a boiling water reactor that is composed of inner webs 2 which are plugged into one another in crosswise fashion, and outer webs 3 surrounding the inner webs 2 in the form of a frame. The inner and outer webs 2, 3 enclose cells 4 of which at least some are penetrated in the mounted state by a fuel rod 5 in each case. Projecting from an inner side 6 of the outer webs 3 are clamping springs 7 that are loaded by the fuel rods 5 approximately in a radial direction. Slots 8 are present in the outer webs 3. Extending into the slots are the inner webs 2, which do so with fixing sections 2a projecting from their lateral end edges, and are welded to the outer web 3 from the outer side thereof. Swirl vanes 9 are disposed at the outer edge of the outer web 3, and deflector vanes 10 are disposed at the lower edge. The first serve the purpose chiefly of turbulently mixing the coolant flowing through a fuel element from bottom to top, and of guiding it to a surface of the fuel rods, while the latter serve as a threading aid when introducing a fuel element bundle into a fuel assembly channel 21.

There is the risk in the region of the two-phase flow of a boiling water fuel element that parts of the surface of the fuel rods are not adequately supplied with water so that so-called "film boiling" occurs there. In this case, a cooling water film is evaporated from the surface without local formation of steam bubbles. The consequence is that the heat produced by the fuel rods is not dissipated or is dissipated unsatisfactorily. In order to counteract this effect, a number of guide devices 11 are present on the outer webs 3. The devices 11 respectively contain a flow opening 12 and guide element 13 that is assigned to the latter and projects from the inner side of the outer web 3 and cooperates with the flow opening in the manner of a Venturi tube. The guide element 13 disposed on the inner side 6 of the outer web 3 effects a constriction of the flow cross section of a flow channel 14 formed by the surface of the fuel rod 5, the inner web 2 and the outer web 3. A subatmospheric pressure is produced in the region of the constriction by comparison with the coolant flowing outside the outer web 3, specifically in the flow channel 15 enclosed by and the fuel assembly channel 21 and the outer webs 3. Consequently, coolant is sucked out of the flow channel 15 into the flow channel 14 via the flow opening 12 (see arrow 29 in FIG. 3B). The cooling potential of this coolant fraction can then be used to cool the fuel rods 5.

The guide elements 13 are flow vanes that are integrally formed on the inner side 6 of the outer webs 3 and enclose with the flat plane of the outer web 3 an acute angle α (FIG. 3B) opening in a longitudinal direction of a fuel rod or in the flow direction 16. In the exemplary embodiments illustrated in FIGS. 1 to 7, the guide element 13 is a flow vane that is formed by a deep-drawn wall region 18 of the outer web 3 adjoining a lower edge 17 of the flow opening. The flow openings 12 are configured in the form of elongated holes, their lower edge 17 and their upper edge 19 extending upwards parallel to one another. Their side edges 20 extend approximately in the flow direction 16. Furthermore, the flow openings 12 are wider than the guide elements 13 such that they project laterally over the latter with an overhang 22.

Each cell 4 adjoining an outer web 3 is assigned a guide device 11, the latter being positioned in each case in a region of the outer web 3 that extends between the clamping spring 7 and the inner web 2. The guide devices 11, 11a of two cells 4, 4a separated from one another by an inner web 2 are positioned at the regions 23, 23a extending away on both sides from the inner web 2. The flow openings 12 can extend, for example, in a fashion transverse to the flow direction 16. However, they are openings aligned obliquely in the case of the exemplary embodiments illustrated in the drawing. The oblique position of two flow openings 12, 12a assigned to neighboring cells 4, 4a is in opposite senses, the openings enclosing an acute angle β (FIG. 1) opening against the flow direction 16. The oblique position imposes a swirl corresponding, for example, to the flow arrows 24 in FIG. 2 from the coolant flow penetrating the flow openings 12, 12a. The coolant entering via the flow opening 12, 12a is therefore guided around the fuel rods 5 in a circumferential direction.

In the exemplary embodiment illustrated in FIGS. 4 to 7, the upper edge 19 of the flow opening 12', 12'a, and the wall region 25, 25a, subsequent thereto, of the outer webs 3 are pre-cambered convexly outward. The pre-cambered wall regions 25 configured in the manner of blades or scoops, project into the flow channel 15 running between the outer web 3 and fuel assembly channel 21, and guide coolant on to the inner side 6 of the outer webs 3 or into the flow channel 14. The refinement adds yet a further coolant fraction to the coolant fraction stemming from the Venturi effect described above. The opposite pre-cambering of the upper edge 19 and the lower edge 17 of the flow openings 12', 12'a increases the passage cross section 26 (FIGS. 6A, 6B) by comparison with openings whose edges run in the flat plane of the outer web 3, and thereby facilitates the flowing in of coolant.

Figure 7:
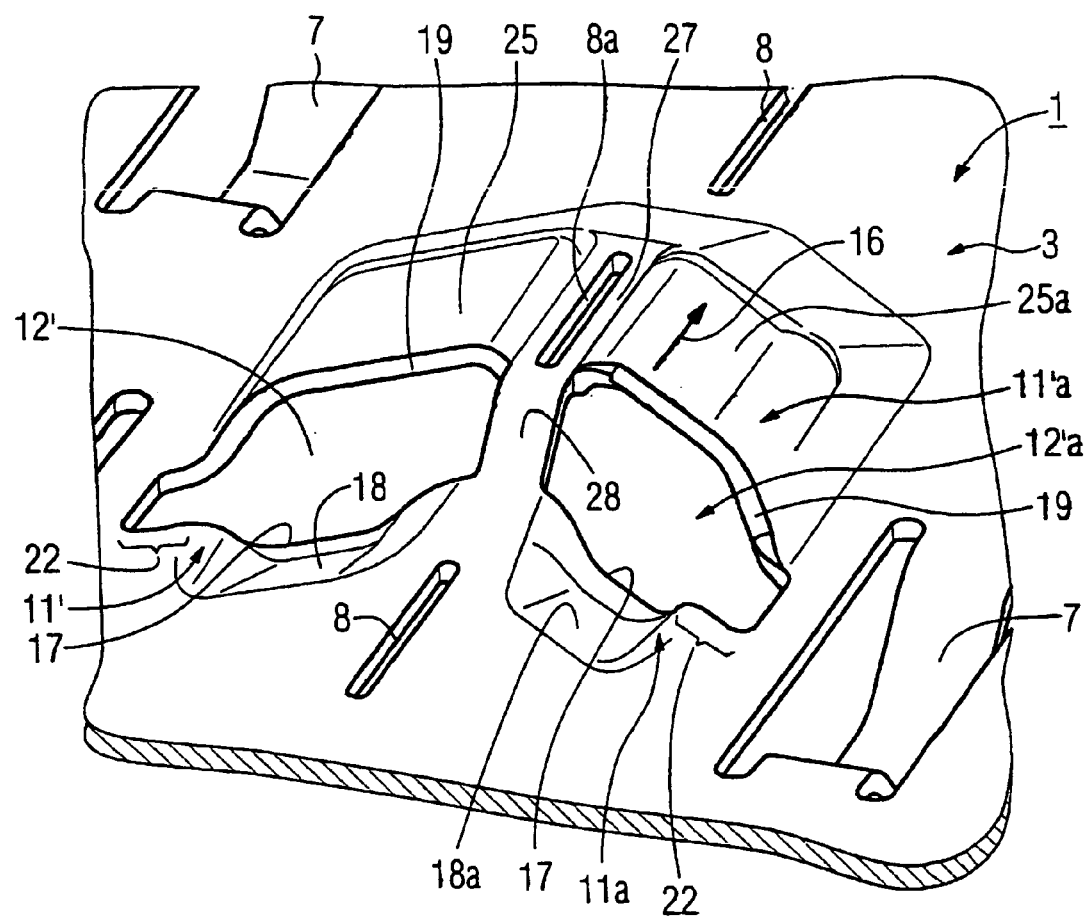
FIG. 7 is a side-elevational view of detail VII shown in FIG. 4, in an enlarged perspective illustration.
Figure 8:
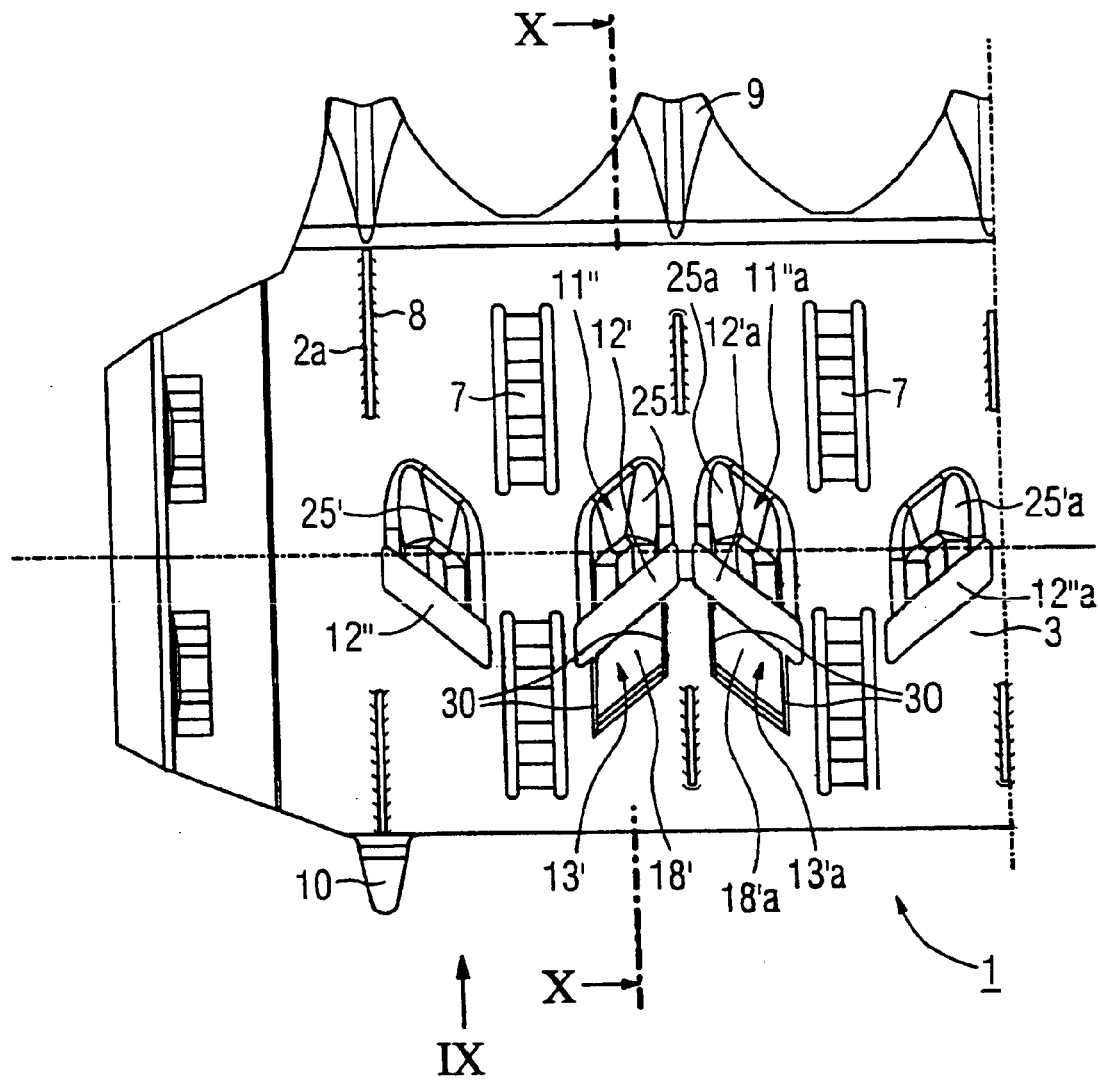
FIG. 8 is a side-elevational view of a third exemplary embodiment of the spacer, in a representation corresponding to FIG. 1.
Figure 9:
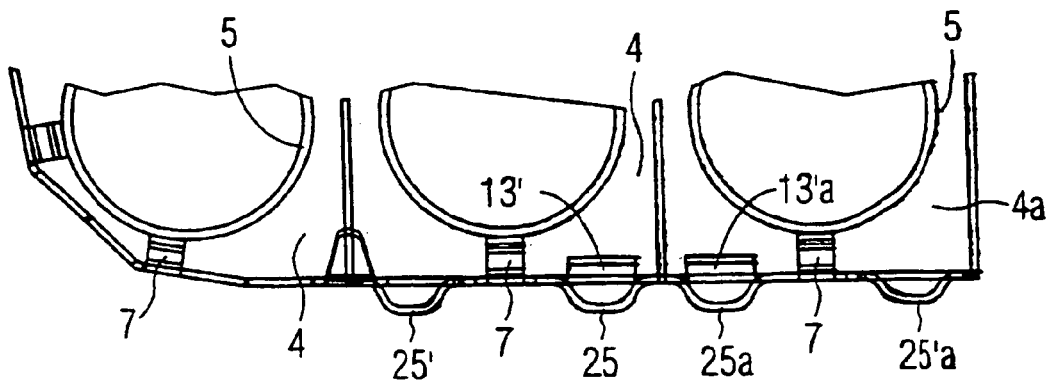
FIG. 9 is a plan view taken in a direction of arrow 1×shown in FIG. 8.

A pair of guide devices 11', 11'a assigned to neighboring cells 4, 4a, is shown in FIG. 7. Disposed between the wall regions 25, 25a is a wall section 27 that is situated deeper and is penetrated by a slot 8a running in the flow direction 16. Adjoining the wall section 27 is a further, obliquely running wall section 28 that separates the two flow openings 12', 12'a from one another. In the case of the embodiment under discussion, the lateral edge of an inner web 2 is shaped in such a way that it extends into the pre-cambering formed by the wall sections 27 and 28. As already described, in the case of the slots 8, the slot 8a is penetrated by a fixing section 2a of the inner web 2. Owing to the configuration of the wall section 27 which is offset inward or deepened, the fixing section 2a can be fixed in the region of the slot 8a from the outside with the aid of welding, without the weld seam projecting beyond the wall regions 25, 25a.

In addition to the flow openings 12, 12' described, it is also possible for flow openings 12" to be present, in the case of which only the upper edge 19 and a wall region 25' subsequent thereto are pre-cambered outward, the lower edge 17 running in the flat plane of the outer web 3 that is to say no inwardly projecting guide element 13 is present (see FIG. 4).

In the exemplary embodiment illustrated in FIGS. 8 to 10B, the guide device 11" has a guide element 13' that is likewise an obliquely inwardly projecting wall region 18'. However, the latter is formed in cutouts 30 that run approximately in the flow direction 16 and open into the lower edge 17 of the flow opening 12'.

I claim:

1. A fuel assembly for a boiling water reactor, comprising:
    inner webs disposed in a crosswise fashion;
    outer webs each having an inner side and surrounding said inner webs in a form of a frame, said inner webs and said outer webs together defining and forming a number of spacers having cells for receiving fuel rods, each of said spacers containing at least one guide device disposed in a respective outer web, said guide device having a flow opening formed therein and a guide element, said guide element as viewed in a flow direction of a coolant, being disposed upstream of said flow opening, and projecting from said inner side of said respective outer web, said guide element constricting a flow channel formed by a surface of a respective fuel rod and said inner and outer webs surrounding the respective fuel rod; and
    inwardly projecting clamping springs each for cooperating with a respective one of the fuel rods and attached to said outer webs;
    said guide device disposed laterally offset from a respective inwardly projecting clamping spring at a region of said respective outer web extending between said respective inwardly projecting clamping spring and a respective inner web, said guide device disposed completely in said region.

2. The spacer according to claim 1, wherein said guide element is a flow vane integrally formed on said respective outer web and forms an acute angle α, opening in the flow direction, with a flat plane of said respective outer web.

3. The spacer according to claim 2, wherein:
    said flow opening has a lower edge; and
    said flow vane is a wall region of said respective outer web, said wall region having two cutouts formed therein defining said flow vane, said two cutouts extending from said lower edge opening into said outer web in an upstream direction, said two cutouts laterally delimiting said flow vane.

4. The spacer according to claim 2, wherein said flow vane is formed by a deep-drawn wall region of said respective outer web that adjoins a lower edge of said flow opening.

5. The spacer according to claim 1, wherein each of said cells adjoining one of said outer webs is assigned at least one said guide device.

6. The spacer according to claim 1, wherein said flow opening has a greater width than said guide element.

7. The spacer according to claim 1, wherein said flow opening is formed as an elongated hole and disposed obliquely to the flow direction.

8. The spacer according to claim 7, wherein said flow opening is one of two adjacently disposed flow openings that are positioned obliquely in opposite senses and enclose an acute angle β opening against the flow direction.

9. The spacer according to claim 8, wherein said two flow openings are assigned to neighboring ones of said cells.

10. The spacer according to claim 1, wherein an upper edge of said flow opening and a wall region of said respective outer web subsequent thereto in the flow direction are cambered convexly outward.

* * * * *